Oct. 5, 1954  R. DE WAARD  2,691,136
AUTOMATIC CIRCUIT-MAKING LIQUID APPLICATOR
Filed Aug. 19, 1952

INVENTOR
RUSSELL DeWAARD,
BY Evans Kahn
ATTORNEY

Patented Oct. 5, 1954

2,691,136

UNITED STATES PATENT OFFICE 2,691,136

AUTOMATIC CIRCUIT-MAKING LIQUID APPLICATOR

Russell De Waard, Rowayton, Conn., assignor to American Cyanamid Company, New York, N. Y., a corporation of Maine Application August 19, 1952, Serial No. 305,266

5 Claims. (Cl. 324—65)

The present invention relates to automatic circuit-making electroconductive liquid applicators. More particularly, the present invention relates to a novel applicator for distributing an electroconductive liquid over a surface and simultaneously closing an electric circuit. The applicator is particularly useful in devices for measuring the resistance of paper to penetration by water and other electroconductive mobile fluids in which the resistance of the paper to penetration by the fluids is measured as a function of the time required for the conductivity of the paper to rise to a predetermined value as the result of the passage of the fluid therethrough.

The determination of the resistance of paper to penetration by water, acids, and bases is a problem of the greatest importance to the paper industry, without which the comparative and absolute effectiveness of sizing and desizing agents, respectively applied to increase the water resistance and bibulousness of paper, cannot be ascertained. In the past, the principal method for measuring the effectiveness of such agents has been to apply a desired test liquid, usually water or ink, to the surface of the paper and to note by means of a stop-watch the time required for the liquid to pass through. In the past simple electrical circuits have been used to indicate visually the end point of the test. An important advance over such methods is disclosed and claimed in copending application Serial No. 278,692, filed on March 26, 1952, by William M. Wooding, entitled "Automatic Instrument for Determining Permeability of Porous Dielectrics" which provides a fully automatic electrical apparatus by which highly reproducible and accurate determinations are made. The present invention constitutes an improvement over the liquid applicators disclosed in that application, and is particularly, but not exclusively, useful in connection therewith.

The Wooding instrument consists essentially of a cylindrical metal collar containing an insulated electrode, a metal plate, and an electrically operated interval timer. The collar, the electrode, and the plate are separately connected to the electrical timing circuit. In making a test upon paper, the metal plate is placed underneath the paper and the collar containing the electrode is placed on top of the paper in register with the plate. A small amount of the test fluid is then introduced within the collar, bridging the gap between the electrode and the collar and starting the interval timer. The timer is automatically stopped when the fluid passes through the paper forming a circuit between the collar and the plate. For testing thin papers of the type of onion-skin paper, India paper and Bible paper with water, the collar is provided with a bottom made of fine wire screening in order to overcome the normal buckling which such papers undergo when wet with an aqueous fluid and to maintain the paper in uniform contact with the metal plate. The application points out that because of its high surface tension, water will not flow through screening of that fineness by gravity, and that to permit uninterrupted access of the water to the paper the screening should be premoistened before it is used.

It has been found that the use of screening in the manner described has a number of disadvantages. In the first place, in the case of soft and delicate tissues such as facial tissues, tissue paper, and toilet paper, a water distribution cone must be provided; otherwise the stream of water, which is delivered by a pressure burette, is forced through the paper directly to the metal plate below. Such a cone reduces the effective area which can be wet by the liquid. A practical difficulty consists in the fact that the test must be performed as soon as the screening is premoistened. In dry weather this moistening evaporates rapidly, and when this occurs the water fails wholly or partially to penetrate the screening, giving erratic results and occasionally no results at all. A further disadvantage is that the instrument requires a separate device such as a burette for delivery of a standard amount of water to the collar.

The discovery has now been made that the above-enumerated disadvantages can be overcome by replacing the burette-collar-electrode combination referred to with the applicator of the present invention. Briefly, this comprises, in combination, a water-absorbent but water-permeable electroconductive plate which is made of a material such as sintered stainless steel, sintered bronze, or sintered nickel, an electroconductive shaft extending at right angles from the plate on which is mounted an insulated electrical contact adapted to slide along the shaft to engagement with the plate, and a releasable detent adapted to lock the electric contact out of engagement with the plate. The shaft and the electrical contact are provided with means for the attachment of electrical wires, permitting the applicator to be inserted into the Wooding or similar circuit in place of the collar-electrode combination referred to.

To prepare the applicator for use, the sliding electrical contact is locked in a position out of engagement with the sintered metal disc, and the applicator is placed in a tray containing a thin film of water about the height of the water-absorbent sintered metal plate. The water is drawn by capillary action into the plate, saturating it. When saturation is complete the applicator is lifted from the tray, any adhering drops of water scraped off, and the lock disengaged. The applicator is then placed on the paper, the contact automatically closing upon the sintered metal plate so that the electrical timing circuit is actuated at virtually the instant the paper becomes wet. During the test, water is released freely by the sintered metal disc to the paper, uniformly wetting the same. Because of the weight of the entire applicator, the paper is maintained in uniform contact with the underlying plate and buckling of the paper is prevented.

Upon completion of the test the applicator is lifted from the paper, the lock re-engaged as before, and the applicator again placed in the tray containing the water.

In the testing of paper only water ink, dilute lactic acid, and dilute sodium hydroxide are commonly used and the device described has demonstrated itself outstandingly useful in the application of these liquids.

One form of such an applicator is disclosed in the drawing, in which.

Figure 1:
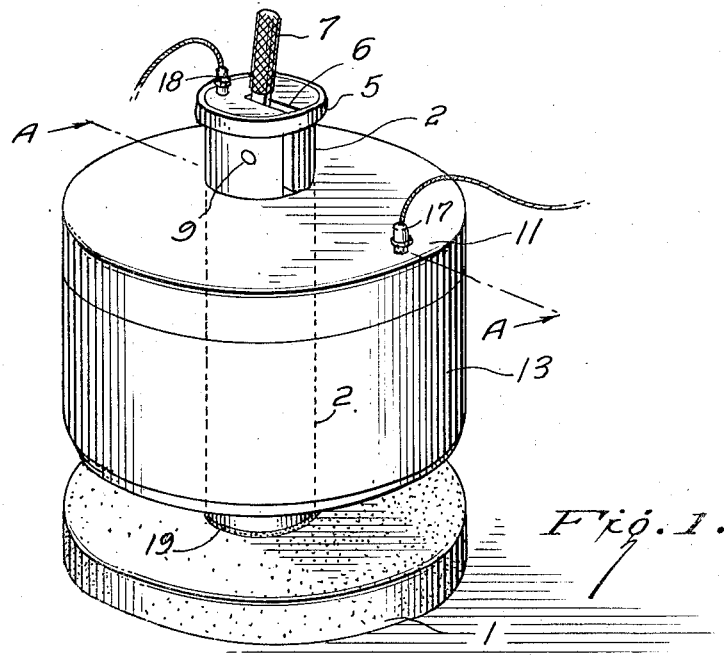
Figure 1 is a perspective of the applicator viewed from slightly above.
Figure 2:
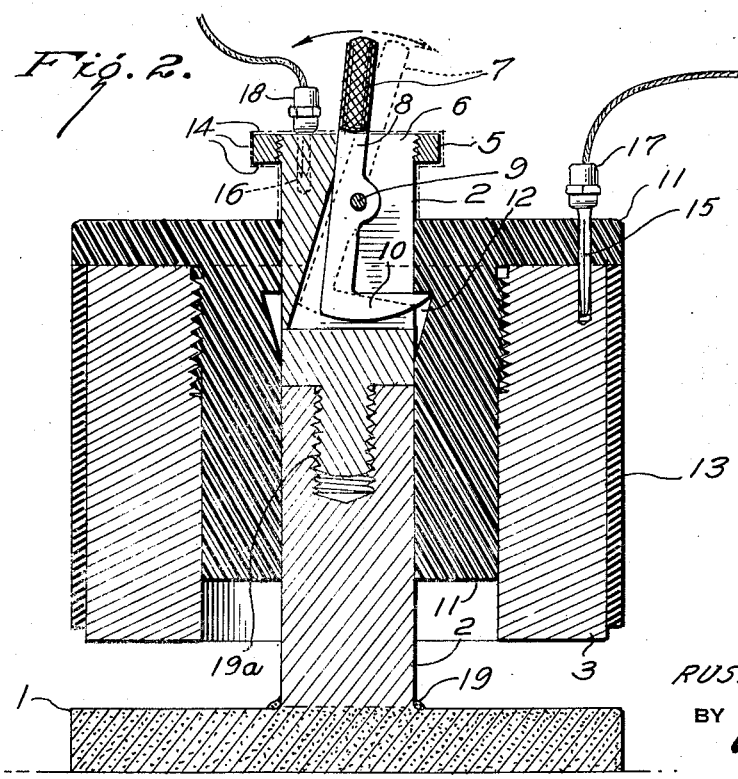
Figure 2 is a vertical section along the line A of Figure 1.

In Figures 1 and 2, the applicator is shown as comprising water-absorbent, water-permeable electro-conductive plate 1, provided with electro-conductive shaft 2 mounted centrally and at right angles thereto by weld 19, and carrying electrical contact 3 shown as a threaded metal cylindrical sleeve provided with insulating bushing 11 and adapted to make and break contact with plate 1 as it slides up and down shaft 2. Shaft 2 is provided with removable flange 5 which acts as a stop for the motion of bushing 11. The upper part of shaft 2 and flange 5 are provided with slot 6 containing a detent consisting of insulated handle 7, lever arm 8 supported by friction pin 9, and pawl 10. Bushing 11 is provided with concentric notch 12 which engages pawl 10 when handle 7 is upright and which is disengaged when handle 7 is moved to the position shown by the dotted lines. Cylindrical contact 3 is insulated peripherally by jacket 13, and shaft 2 and flange 5 are insulated by baked-on enamel film 14, and both are provided with miniature jacks 15 and 16 containing plugs 17 and 18. Shaft 2 is made in two sections as shown by threading 19a permitting the upper part to be made of a soft metal to facilitate machining.

In the construction of the device, stainless steel is preferred, but any metal resistant to the fluids employed may be used. Plate 1, therefore, will preferably be formed from stainless steel particles sintered together to provide a water-absorbent, water-permeable plate having a pore size of about 20 microns. For use in the testing of thin paper the diameter of the plate may conveniently be about 1", and its thickness about 1/8", such a plate, when made of the materials suggested, having a water capacity of about 0.55 gm. which is ample for the purpose intended. The total weight of the applicator should be sufficient to exert a firm pressure on the paper without crushing the fibers. When the diameter of the sintered disc is about 1", good results are obtained when the applicator weighs 50 to 100 gm.

The fit between shaft 2 and bushing 11 should be loose to permit a free sliding motion, but the fit between pin 9, shaft 2 and lever arm 8 should be sufficiently tight to prevent pawl 10 from swinging under the effect of gravity. Bushing 11 is preferably machined from a rod of polystyrene or similar strong, water-resistant insulating plastic and contact sleeve 3 from stainless steel or a heavier material such as lead. The peripheral insulation 13 of sleeve 3 is thin rubber or neoprene. The bottom part of shaft 2 is advantageously of the same material as plate 1, whereas the upper part may be of a softer, more easily machined metal such as aluminum or brass. It is unnecessary that the sintered metal plate have a pore size of 20 microns, as is preferred. It is only necessary that the disc be water-absorbent, that is, capable of absorbing water by capillary action in the manner of blotting paper and be water-permeable so that it will reelase a saturating amount of water when pressed firmly against a thin sheet of paper.

The particular design of apparatus shown above does not constitute the only practical embodiment of my invention, and the component parts thereof are conventional. What I do regard as my invention and therefore claim is:

1. An applicator for distributing an electro-conductive liquid over a surface, said applicator automatically completing an electrical circuit when placed on said surface, which comprises, in combination, a water-absorbent, water-permeable electro-conductive plate, an electro-conductive shaft extending at right angles from said plate, an electric contact adapted to slide along said shaft into engagement with said plate but electrically insulated from said shaft, and a releasable detent adapted to lock said electric contact out of engagement with said plate.

2. An applicator according to claim 1 wherein the electrical contact is an electro-conductive sleeve adapted to slide concentrically along said shaft.

3. An applicator according to claim 2 wherein said sleeve is a peripherally electrically insulated sleeve.

4. An applicator according to claim 3 wherein said plate is a sintered metal plate having an average pore size of about 20 microns.

5. An applicator according to claim 1 wherein said plate is a sintered metal plate having an average pore size of about 20 microns.

References Cited in the file of this patent
UNITED STATES PATENTS

| Number | Name | Date |
|---|---|---|
| 2,082,364 | Store | June 1, 1937 |
| 2,506,478 | Wright | May 2, 1950 |
| 2,520,394 | Lutz | Aug. 29, 1950 |
| 2,529,080 | Hart | Nov. 7, 1950 |